(12) United States Patent
Ito et al.

(10) Patent No.: US 9,241,238 B2
(45) Date of Patent: Jan. 19, 2016

(54) WIRELESS COMMUNICATION SYSTEM AND WIRELESS COMMUNICATION METHOD

(71) Applicant: KABUSHIKI KAISHA TOSHIBA, Minato-ku, Tokyo (JP)

(72) Inventors: Takayoshi Ito, Kanagawa (JP); Ariyuki Kishimoto, Tokyo (JP); Koji Akita, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/472,510

(22) Filed: Aug. 29, 2014

(65) Prior Publication Data

US 2015/0065050 A1   Mar. 5, 2015

(30) Foreign Application Priority Data

Aug. 30, 2013 (JP) .................. 2013-180439

(51) Int. Cl.
*H04W 12/02* (2009.01)
*H04W 4/00* (2009.01)
*H04L 29/06* (2006.01)
*H04W 12/08* (2009.01)

(52) U.S. Cl.
CPC ............... *H04W 4/008* (2013.01); *H04L 63/12* (2013.01); *H04W 12/08* (2013.01)

(58) Field of Classification Search
CPC ....... H04L 63/12; H04W 12/08; H04W 4/008
USPC ........... 455/41.1, 41.2, 67.11, 466, 73, 412.1, 455/414.1, 415, 9, 41.3, 292; 705/44, 67; 709/206, 217; 340/572.7, 447, 573.1; 375/257, 258

See application file for complete search history.

(56) References Cited

U.S. PATENT DOCUMENTS

| | | | |
|---|---|---|---|
| 8,396,136 B1* | 3/2013 | Pezeshkian | H04B 5/0012 257/678 |
| 2007/0069901 A1* | 3/2007 | Tuck | C11D 3/50 340/573.1 |
| 2007/0105570 A1* | 5/2007 | Clark | H04L 51/38 455/466 |

(Continued)

FOREIGN PATENT DOCUMENTS

| | | |
|---|---|---|
| JP | 2002-342685 A | 11/2002 |
| JP | 2006-195627 A | 7/2006 |

(Continued)

*Primary Examiner* — Tan H Trinh
(74) *Attorney, Agent, or Firm* — Ohlandt, Greeley, Ruggiero & Perle, L.L.P.

(57) ABSTRACT

A wireless communication system has a first communication apparatus and a second communication apparatus. The first communication apparatus has an information generator to generate first information associated with a mobile terminal, an encoder to encode the first information, and a first wireless communication module to transmit the encoded first information to the mobile terminal by close range wireless communication. The second communication apparatus has a second wireless communication module to receive the encoded first information transmitted by the mobile terminal and second information, a decoder to decode the encoded first information, a verification module to verify validity of the first information, and an information processing module to process the second information received by the second wireless communication module when the validity is confirmed by the verification module.

16 Claims, 7 Drawing Sheets

(56) References Cited

U.S. PATENT DOCUMENTS

| | | | | |
|---|---|---|---|---|
| 2007/0222609 A1* | 9/2007 | Duron | G06K 7/0008 | 340/572.7 |
| 2007/0283973 A1* | 12/2007 | Longley | A61F 5/566 | 131/329 |
| 2009/0181622 A1* | 7/2009 | Hardacker | H04B 1/40 | 455/73 |
| 2011/0012722 A1* | 1/2011 | Petrucelli | B60C 23/0401 | 340/442 |
| 2011/0012723 A1* | 1/2011 | Adamson | B60C 23/0408 | 340/447 |
| 2013/0166682 A1* | 6/2013 | Kakihara | H04L 67/00 | 709/217 |
| 2013/0226812 A1* | 8/2013 | Landrok | G06Q 20/4016 | 705/67 |
| 2014/0057557 A1* | 2/2014 | Hadizad | H04W 8/22 | 455/41.1 |
| 2014/0207682 A1* | 7/2014 | Wolfond | G06Q 20/027 | 705/44 |
| 2014/0249878 A1* | 9/2014 | Kaufman | G06Q 10/1095 | 705/7.19 |

FOREIGN PATENT DOCUMENTS

| | | | |
|---|---|---|---|
| JP | 2006-331437 | A | 12/2006 |
| JP | 2009-175980 | A | 8/2009 |
| JP | 2012-48694 | A | 3/2012 |

* cited by examiner

WIRELESS COMMUNICATION SYSTEM AND WIRELESS COMMUNICATION METHOD

CROSS-REFERENCE TO RELATED APPLICATIONS

This application is based upon and claims the benefit of priority from Japanese Patent Application No. 2013-180439, filed on Aug. 30, 2013, the entire contents of which are incorporated herein by reference.

FIELD

Embodiments of the present invention relate to a wireless communication system and a wireless communication method for performing close range wireless communication.

BACKGROUND

When an accounting process is performed at shops such as restaurants, there is a problem that it is impossible to acquire and manage order information for each customer if batch order processing is performed for each group of customers. In order to solve this problem, for example, a method for settling an account for each order has been proposed in which a touch-panel ordering terminal allocated to each group is used and has an electronic money settlement function using RFID tags.

However, the known ordering terminal has a problem that a settlement can be made only for one person at a time, not for a group.

Moreover, it is not desirable from a point of view of personal-information protection to carelessly acquire customer's personal information when order processing is performed for each customer.

DETAILED DESCRIPTION

According to one embodiment, a wireless communication system has:
a first communication apparatus to perform wireless communication with a mobile terminal; and
a second communication apparatus to perform wireless communication with the mobile terminal.

Wherein the first communication apparatus has:
an information generator to generate first information associated with the mobile terminal;
an encoder to encode the first information; and
a first wireless communication module to transmit the encoded first information to the mobile terminal by close range wireless communication.

The second communication apparatus has:
a second wireless communication module to receive the encoded first information transmitted by the mobile terminal and second information generated by the mobile terminal, by wireless communication;
a decoder to decode the encoded first information received by the second wireless communication module;
a verification module to verify validity of the first information decoded by the decoder; and
an information processing module to process the second information received by the second wireless communication module when the validity is confirmed by the verification module.

Embodiments will now be explained with reference to the accompanying drawings.

First Embodiment

Figure 1:
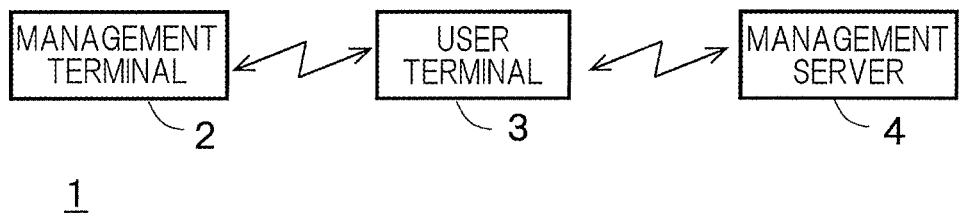
FIG. 1 is a block diagram schematically showing a wireless communication system 1 according to a first embodiment.

FIG. 1 is a block diagram schematically showing a wireless communication system 1 according to a first embodiment.

The wireless communication system 1 of FIG. 1 is provided with a management terminal (a first communication apparatus) 2, a user terminal (a mobile terminal) 3, and a management server (a second communication apparatus) 4.

The management terminal 2 performs wireless communication with the user terminal 3. The management terminal 2 is not limited to any specific form. It is, for example, an order-receiving handy terminal carried by a shop assistant.

The user terminal 3 is a mobile terminal carried by a user, such as, a mobile phone, a smart phone and a tablet.

The management server 4 is a communication apparatus capable of wireless communication with the user terminal 3, that is, for example, computer equipment such as a PC and a work station.

Figure 2:
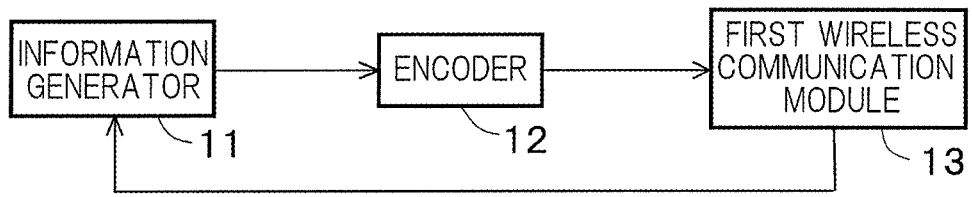
FIG. 2 is a block diagram showing an example of a management terminal 2.

FIG. 2 is a block diagram showing an example of the internal configuration of the management terminal 2. The management terminal 2 of FIG. 2 has an information generator 11, an encoder 12, and a first wireless communication module 13.

The information generator 11 generates first information associated with each user terminal 3. Namely, the information generator 11 generates first information that has no relation with personal information of a user who carries the user terminal 3. Having no relation with user personal information means that user personal information is not included in the first information. The information generator 11 generates new first information whenever the first wireless communication module 13 performs close range wireless communication with a new user terminal 3. Each first information includes identification information distinguishable from other first information. The identification information may, for example, be an identification number that is incremented whenever the information generator 11 generates first information.

The encoder 12 encodes first information generated by the information generator 11. Encoding is not limited to a specific method. The encoded first information is, as described later, decoded by the management server 4. Thus, it is required for the management terminal 2 and the management server 4 to share key information to be used for encoding the first information. The reason for encoding the first information is that the management server 4 can verify that the first information is valid information issued by the management terminal 2.

Figure 3:
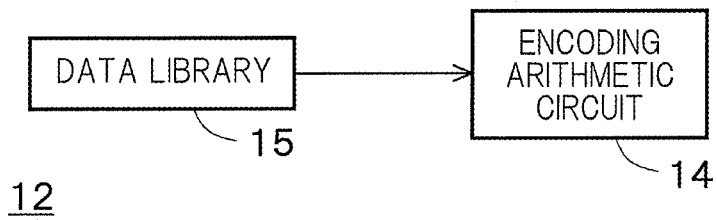
FIG. 3 is a block diagram showing an example of an encoder 12.

FIG. 3 is a block diagram showing an example of the internal configuration of the encoder 12. The encoder 12 of FIG. 3 has an encoding arithmetic circuit 14 and a data library 15. The data library 15 has encoding data and encoding keys to be used for encoding first information, stored therein. The management server 4 also has these encoding data and encoding keys. The encoding arithmetic circuit 14 encodes first information by using the encoding data and encoding keys.

The first wireless communication module 13 transmits the encoded first information to the user terminal 3 by close range wireless communication. In order to perform close range wireless communication, the user terminal 3 has to be located closer to the management terminal 2. For example, when a shop assistant approaches a user who has visited a shop, while holding a mobile management terminal 2, the encoded first information is transmitted to the user terminal 3 from the first wireless communication module 13 of the management terminal 2 by close range wireless communication. Or a user who has visited a shop may approach a stationary management terminal 2 to receive the encoded first information.

When the user terminal 3 has normally received encoded first information, the user terminal 3 informs a user that the reception of the first information is complete, by sounds, display, etc. Accordingly, the user acknowledges the reception of the first information.

The close range wireless communication may be non-contact communication by electromagnetic induction such as NFC (Near Field Communication) or Felica (a registered trade mark), or non-contact communication with microwaves or millimeter waves such as TransferJet (a registered trade mark), WiFi or UWB.

A user enters information selected from among provided services or goods into the user terminal 3. The entered information is treated as second information and transmitted from the user terminal 3 to the management server 4, together with the encoded first information described above.

Figure 4:
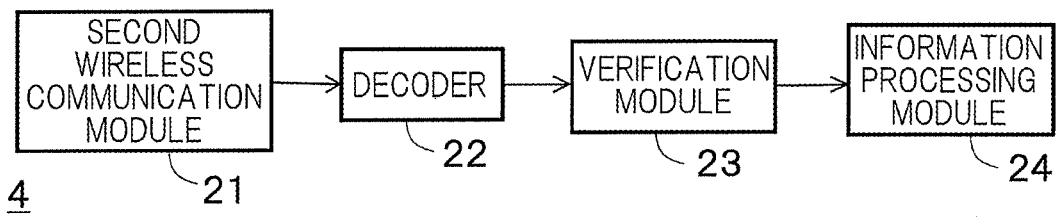
FIG. 4 is a block diagram showing an example of a management server 4.

FIG. 4 is a block diagram showing an example of the internal configuration of the management server 4. The management server 4 of FIG. 4 has a second wireless communication module 21, a decoder 22, a verification module 23, and an information processing module 24. The second wireless communication module 21 performs wireless communication with the user terminal 3. There is no particular limitation on the wireless communication method. Thus, the second wireless communication module 21 may use wireless LAN, Bluetooth (a registered trade mark), close range wireless communication, etc.

The decoder 22 decodes encoded first information. The verification module 23 verifies the validity of first information decoded by the decoder 22. The decoded first information is determined to be valid if it is the first information generated by the management terminal 2. For example, the verification module 23 acquires, in advance, the data structure (such as the number of bits, allocated bit values, etc.) of first information to verify the decoded first information whether the decoded first information has a correct data structure.

When the validity of first information is confirmed by the verification module 23, the information processing module 24 processes second information transmitted from the user terminal 3. For example, when the second information includes a user request for services or goods, the information processing module 24 provides the user with the services or goods according to the request.

The user terminal 3 has a wireless function to perform close range wireless communication with the first wireless communication module 13 in the management terminal 2 and a wireless function to perform wireless communication with the second wireless communication module 21 in the management server 4. As described above, a general-purpose mobile terminal can be used as the user terminal 3. Thus, the explanation of the internal configuration of the user terminal 3 is omitted.

Figure 5:
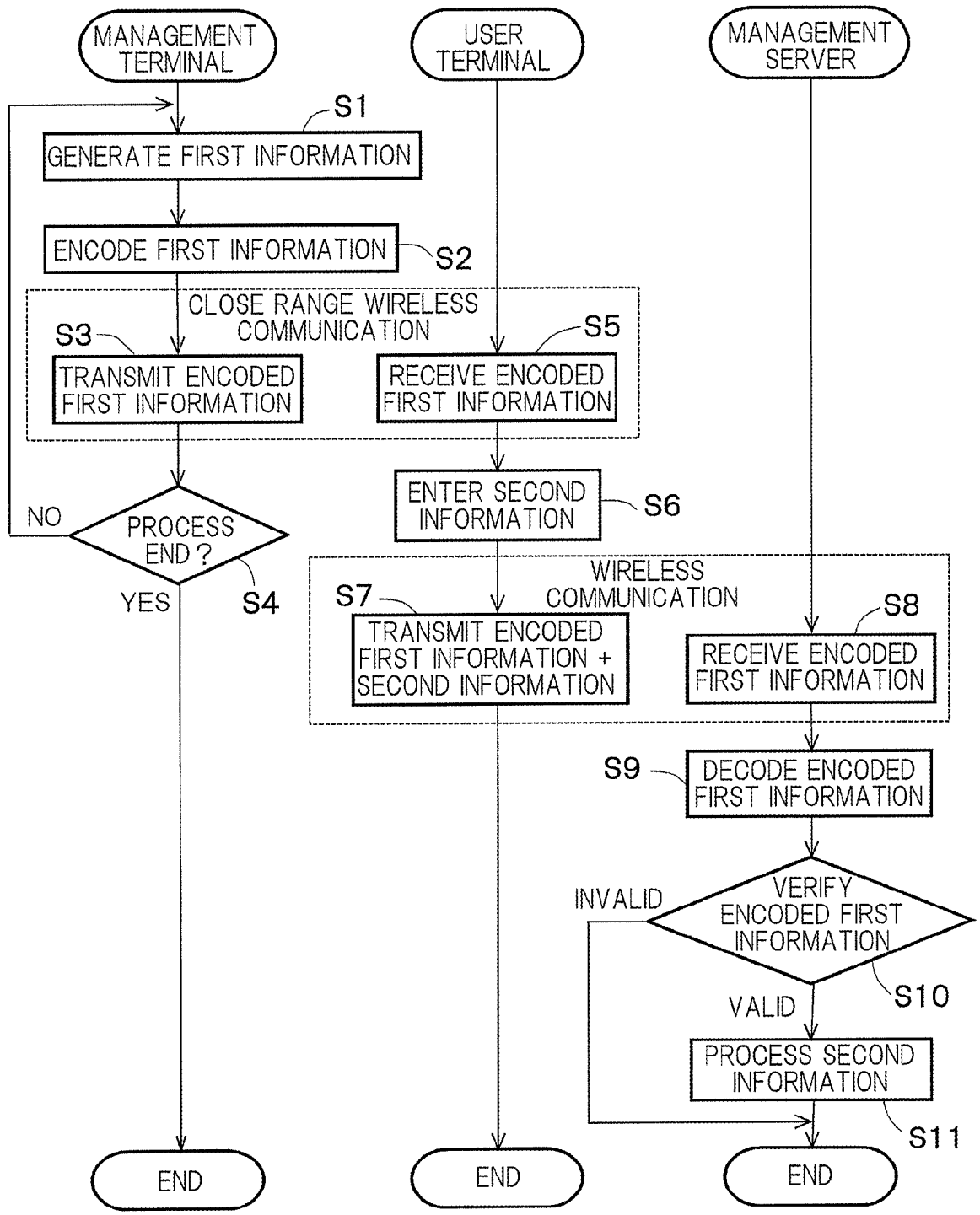
FIG. 5 is a flowchart showing process operations performed by a management terminal 2, a user terminal 3 and a management server 4.

FIG. 5 is a flowchart showing process operations performed by the management terminal 2, the user terminal 3 and the management server 4. The process of FIG. 5 starts when the first wireless communication module 13 in the management terminal 2 comes into the state capable of close range wireless communication with the user terminal 3.

Firstly, the information generator 11 in the management terminal 2 generates first information (step S1). Next, the encoder 12 in the management terminal 2 encodes the first information (step S2). Next, the first wireless communication module 13 in the management terminal 2 transmits the encoded first information to the user terminal 3 by close range wireless communication (step S3).

When there are a plurality of user terminals 3 capable of close range wireless communication, for example, when a group of a plurality of users visits a shop, it is determined whether steps S1 to S3 have been performed for all user terminals 3 in the group (step S4). If steps S1 to S3 have been performed for all the user terminals 3, the process of the management terminal 2 ends.

The user terminal 3 receives the encoded first information from the management terminal 2 by close range wireless communication (step S5). Next, a user enters second information related to services or goods he or she requests on his or her user terminal 3 (step S6). Next, the user terminal 3 transmits the encoded first information transmitted from the management terminal 2 and the second information entered in step S6 to the management server 4 by wireless communication (step S7). Then, the process of the user terminal 3 ends.

The user terminal 3 transmits the encoded first information sent from the management terminal 2 to the management server 4 in an encoded state. The user terminal 3 does not have a function of decoding the encoded first information. Thus, there is no risk of the first information being altered by the user terminal 3. Moreover, the user terminal 3 does not have a function of encoding the first information. Thus, it is also impossible that the first information is forged, encoded and then transmitted to the management server 4 by the user terminal 3.

The second wireless communication module 21 in the management server 4 receives the encoded first information and also second information transmitted from the user terminal 3 (step S8). Next, the decoder 22 decodes the encoded first information (step S9). Next, the verification module 23 verifies the validity of the decoded first information (step S10). As a result, if the validity of the first information is confirmed, the information processing module 24 processes the received second information (step S11). However, if the validity of the first information cannot be confirmed, the process ends without processing the second information.

Although the first information generated by the management terminal 2 does not include user personal information, the first information is issued for each user terminal 3. Thus, the management server 4 can associate the first information with user terminals 3, and manage the second information for each user terminal 3 associated with the first information.

Figure 6:
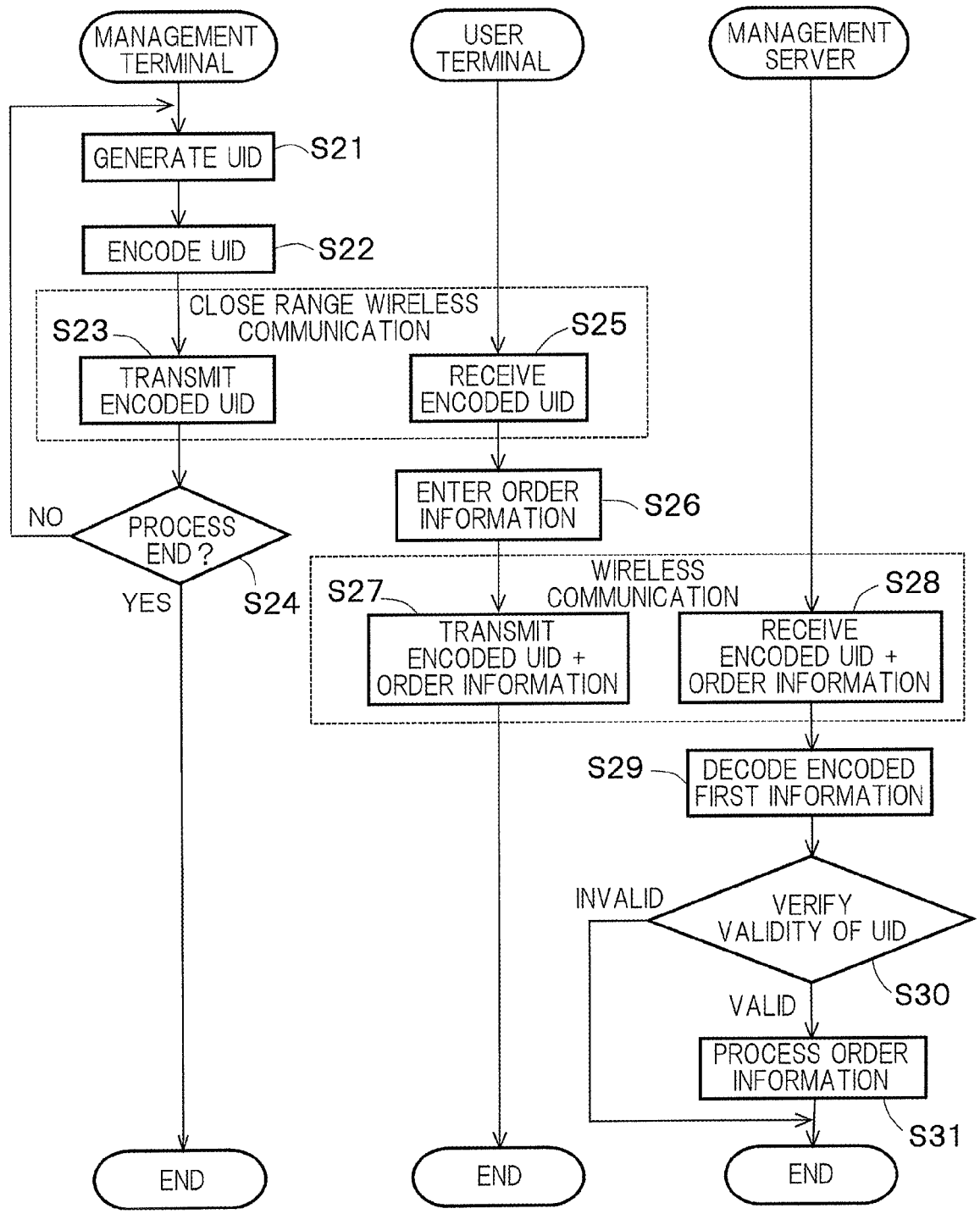
FIG. 6 is a flowchart showing an example of a more concrete version of the process of FIG. 5.

FIG. 6 is a flowchart showing an example of more specifically reciting the process of FIG. 5. The process flow of FIG. 6 is the same as FIG. 5, hence the different points will be mainly explained below.

In the flowchart of FIG. 6, a user ID (UID) is used as the first information. The user ID is not associated with personal information of each user who carries the user terminal 3 but is identification information that is generated by the information generator 11 in the management terminal 2 to identify each user terminal 3 with which the management terminal 2 communicates by close range wireless communication. The management terminal 2 generates a user ID only for a user terminal 2 with which the management terminal 2 communicates by close range wireless communication for the first time (step S21), and after encoding the user ID (step S22), transmits the encoded user ID to the user terminal 3 (steps S23 and S24).

In the flowchart of FIG. 6, the second information entered by a user into the user terminal 3 is order information for services, goods, etc. (steps S25, S26). Thus, the user terminal 3 transmits the encoded user ID and the order information to the management server 4 by wireless communication (step S27).

The second wireless communication module 21 in the management server 4 receives the encoded user ID and the order information (step S28) and then decodes the user ID (step S29). Then, when the validity of the user ID is confirmed, the management server 4 performs an order receiving process in accordance with the received order information (steps S30, S31). The order receiving process may include a billing process.

According to the process of FIG. 6, the order receiving process or the billing process can be performed for services or goods provided to a user, for each user terminal 3 associated with the first information. Accordingly, without touching user personal information, the record and charged amounts of services or goods provided or sold to each user can be managed. Thus, it is possible to know how services or goods have been sold, which is useful for development of new services or goods. Moreover, each user can request services or goods via his or her user terminal 3, so that a shop assistant can save labor for entering an order from a user into a handy terminal or the like.

As described above, according to the first embodiment, by dividing processes among the management terminal 2, the user terminal 3, and the management server 4, it is possible to receive an order for services or goods from each user to perform a billing process and correctly manage the record of services or goods for each user, without using user personal information and without through a shop assistant.

Second Embodiment

The second embodiment which will be explained below is to perform batch order processing for a group of a plurality of users.

Figure 7:
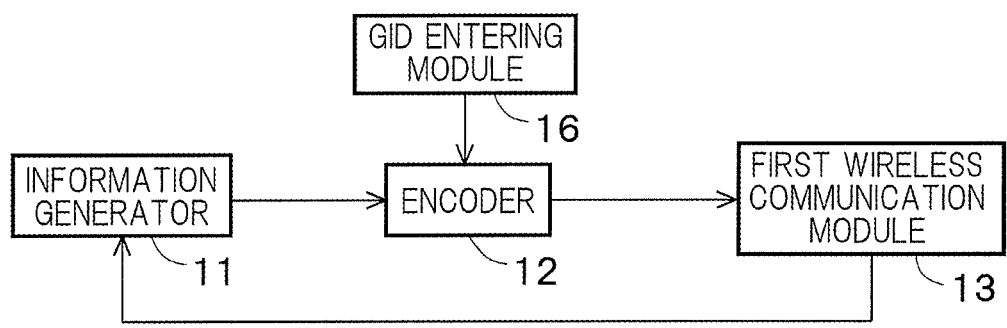
FIG. 7 is a block diagram showing a management terminal 2 according to a second embodiment.
Figure 8:
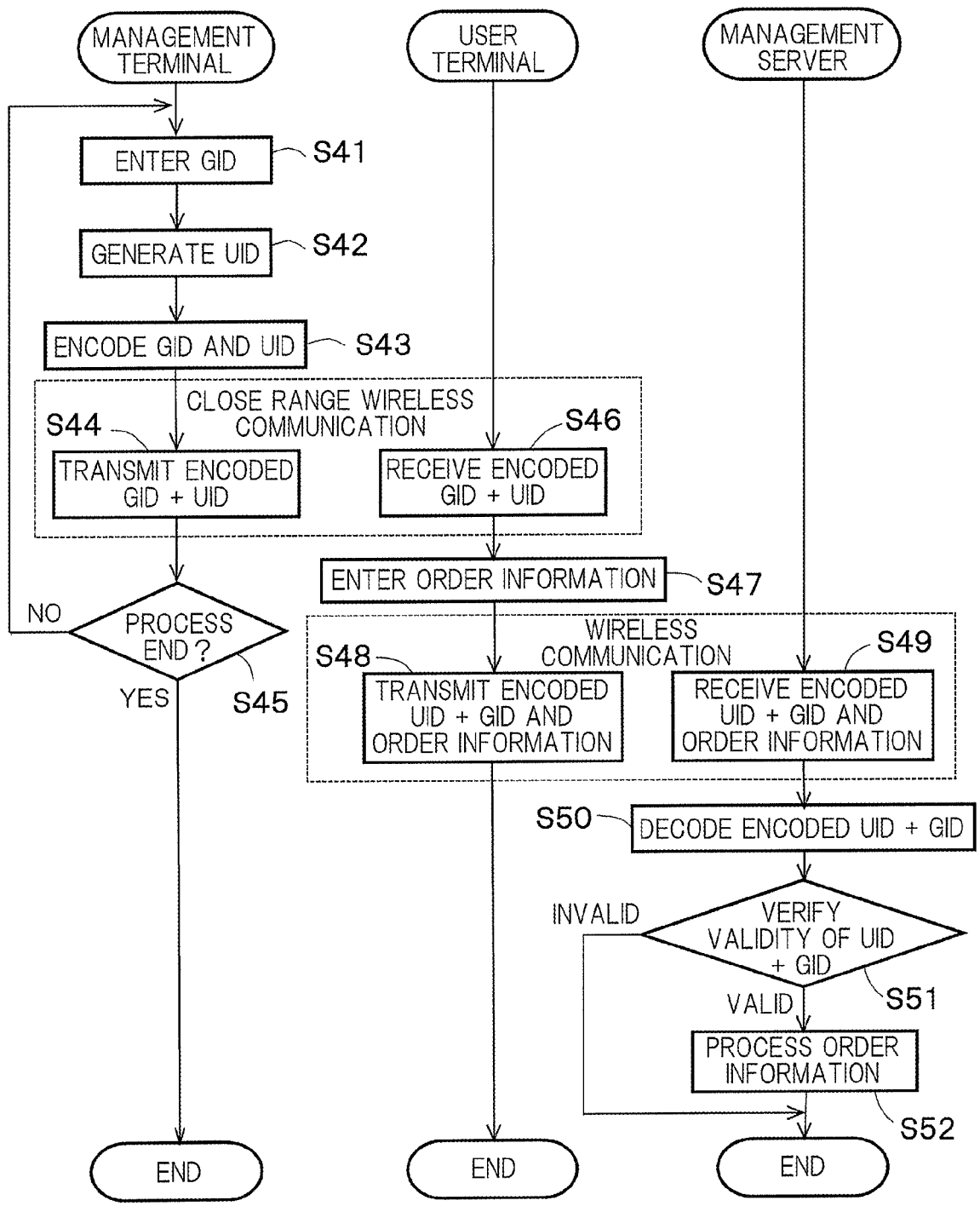
FIG. 8 is a flowchart showing process operations of the second embodiment.

FIG. 7 is a block diagram showing the internal configuration of a management terminal 2 according to the second embodiment. FIG. 8 is a flowchart showing process operations of the second embodiment. The management terminal 2 of FIG. 7 has a group-information entering module (GID entering module) 16 in addition to the internal configuration of the management terminal 2 of FIG. 2.

When a plurality of customers visit a shop, it is difficult to automatically determine whether the plurality of customers belong to one group. For this reason, it is a precondition that a shop assistant or the like manually enters a group ID (GID) (step S41). For example, when it is determined that n (n being an integer of 2 of more) customers belong to the same group, the same group ID is given to the n customers.

The encoder 12 in the management terminal 2 encodes first information (here, a user ID) generated by the information generator 11 and a group ID (steps S42 to S45).

When the user terminal 3 receives the encoded user ID and group ID by close range wireless communication (step S46), the user terminal 3 transmits the encoded user ID and group ID to the management server 4, together with entered order information, by wireless communication (steps S47, S48).

When the management server 4 receives the encoded user ID and group ID, and the order information (step S49), the management server 4 decodes the user ID and group ID (step S50) and verifies the validity of the user ID and group ID (step S52). If the user ID and group ID are valid, the management server 4 performs order processing based on the order information (step S52).

As described above, according to the second embodiment, order processing per user and per group can be done in parallel because user identification information provided for each user terminal 3 and a group ID provided for each group of a plurality of user terminals 3 are transmitted to the management server 4. Thus, it is possible to manage the records of orders for each user and also each group. Accordingly, it is possible to know the characteristic of a group visiting a shop depending on season, time zone, etc., thereby using it for development of new services or goods. Moreover, since a settlement process can be done for each group, a batch calculation process per group becomes easy. Furthermore, by making association between a group ID and an order when the order is accepted via a shop assistant, it becomes easy to perform an add-up process for an order under this system and another order.

Third Embodiment

A third embodiment which will be explained below is to transmit menu information that expresses a list of services or goods available to users.

Figure 9:
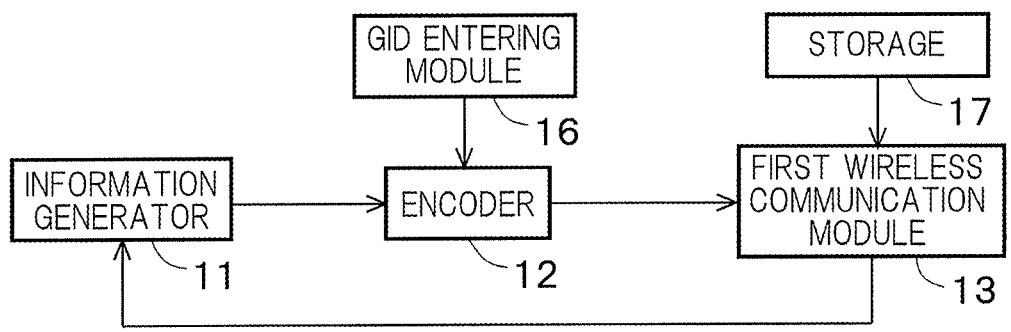
FIG. 9 is a block diagram showing a management terminal 2 according to a third embodiment.
Figure 10:
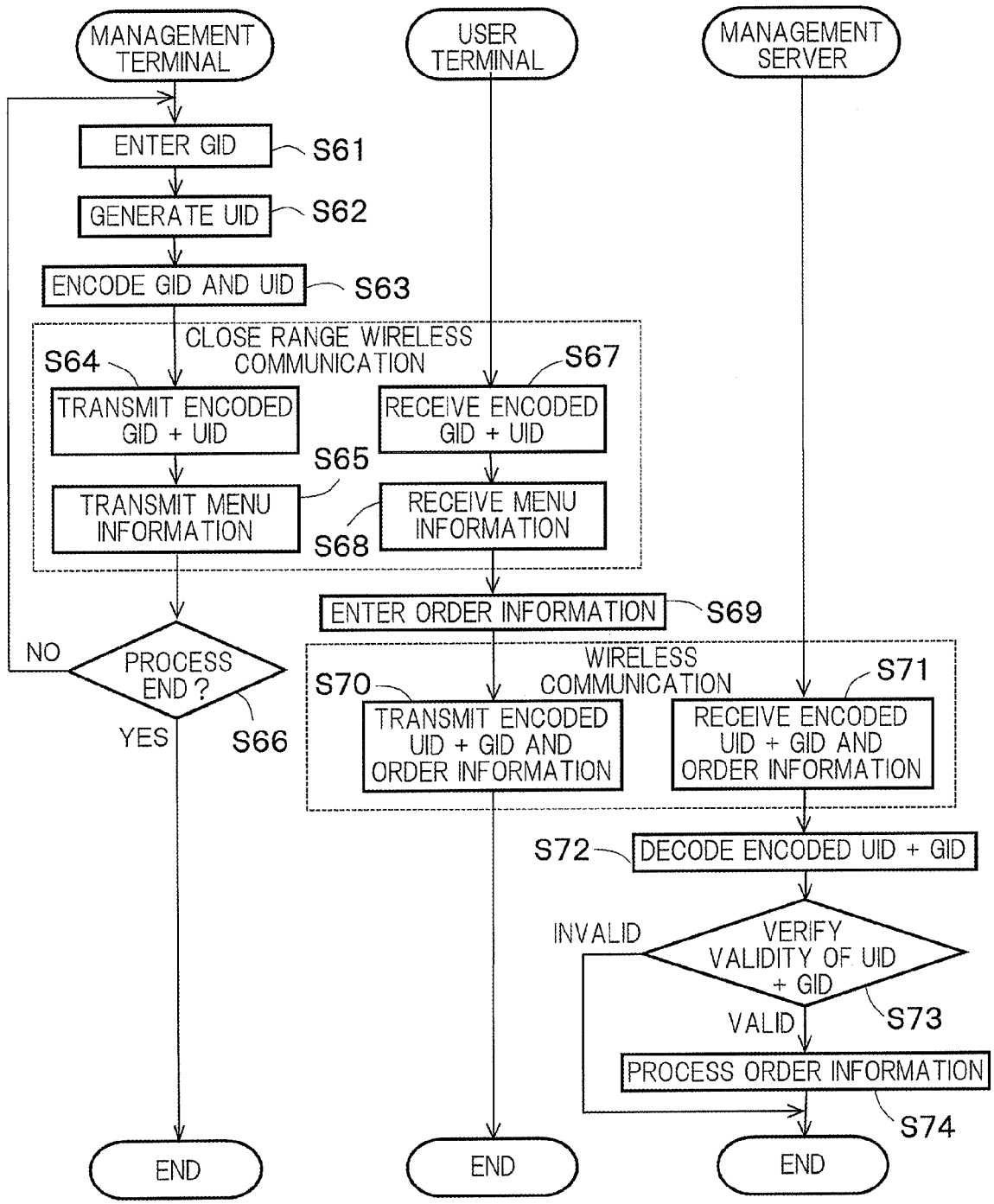
FIG. 10 is a flowchart showing process operations of the third embodiment.

FIG. 9 is a block diagram showing the internal configuration of a management terminal 2 according to the third embodiment. FIG. 10 is a flowchart showing process operations of the third embodiment. The management terminal 2 of FIG. 9 has a storage 17 in addition to the internal configuration of the management terminal 2 of FIG. 7.

The storage 17 stores menu information to be transmitted to the user terminal 3. The stored menu information can be transmitted to the user terminal 3 by close range wireless communication and be displayed on a display module of the user terminal 3. A user selects a service or goods in accordance with the menu information displayed on the display module of the user terminal 3.

The management terminal 2 encodes a group ID and first information (steps S61 to S63) and then transmits the encoded group ID and first information to the user terminal 3, together with menu information, by close range wireless communication (steps S64 to S66). The menu information is not required to be encoded.

When the user terminal 3 receives the group ID, user ID and menu information by close range wireless communication (steps S67, S68), the menu information is displayed on the display module. When a user selects a desired service or goods in accordance with the menu information (step S69), the user terminal 3 transmits the selected information as order information to the management server 4 together with the encoded group ID and user ID by wireless communication (step S70).

The management server 4 decodes the encoded group ID and user ID (step S71) and verifies the validity thereof, and if the validity is confirmed, performs order processing in accordance with the order information (steps S72 to S74).

The menu information described above may include link information such as moving pictures and relevant information. Nevertheless, the menu information including moving and/or still pictures has a larger data amount. Thus, the close range wireless communication in this case is desirable to be performed with a communication method capable of large capacity transmission such as millimeter wave communication. It is an advantage of this embodiment that, by transmitting menu information to the user terminal 3, users do not need to have knowledge about services or goods in advance. The kind of menu information to be transmitted from the management terminal 2 to the user terminal 3 may be changed depending on the customer type such as the gender or age of users. In this way, it is possible to provide each user with menu information suitable to the user.

A more complete example is video rental shops. When a user visits a video rental shop and close range wireless communication with the management terminal 2 is made possible, the management terminal 2 transmits the encoded user ID and content information to the user terminal 3 by close range wireless communication. The content information is menu information including a plurality of pieces of content arbitrary selectable by the user. The user terminal 3 transmits the encoded user ID and information on specific content selected from the content information to the management server 4 by wireless communication. The management server 4 decodes the encoded user ID and verifies the validity of the user ID. When the validity of the user ID is confirmed, the shop provides the user with the specific content. Content may be provided by being copied to an optical disk or a memory medium, or by being transmitted to the user terminal 3 by wireless communication. Shops do not need to have a stock of packaged goods such as movie DVDs available on the market so that a cost for law materials can be reduced and the space for stocks is not needed. Moreover, by making association between user IDs and content, the content copyright can be protected.

As described above, in the third embodiment, since menu information is transmitted from the management terminal 2 to the user terminal 3, a shop assistant does not need to hand the menu information over to a user who has visited a shop. Moreover, users can complete an ordering process only by selecting desired services or goods from menu information displayed on the user terminal 3, with no need to enter the name or the like of services or goods, hence convenience is improved for users.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication system comprising:
   a first communication apparatus to perform wireless communication with a mobile terminal; and
   a second communication apparatus to perform wireless communication with the mobile terminal,
   wherein the first communication apparatus comprises:
   an information generator to generate first information associated with the mobile terminal;
   an encoder to encode the first information; and
   a first wireless communication module to transmit the encoded first information to the mobile terminal by close range wireless communication, and
   the second communication apparatus comprises:
   a second wireless communication module to receive the encoded first information transmitted by the mobile terminal and second information generated by the mobile terminal, by wireless communication;
   a decoder to decode the encoded first information received by the second wireless communication module;
   a verification module to verify validity of the first information decoded by the decoder; and
   an information processing module to process the second information received by the second wireless communication module when the validity is confirmed by the verification module.

2. The system of claim 1, wherein the first information has no relation with personal information of a user of the mobile terminal and includes identification information capable of identifying the mobile terminal.

3. The system of claim 2, wherein the information generator generates the first information associated with a new mobile terminal when the first wireless communication module comes into a state capable of close range wireless communication with the new mobile terminal.

4. The system of claim 1, wherein the first information includes identification information capable of identifying a group of a plurality of mobile terminals.

5. The system of claim 4, wherein the information processing module in the second communication apparatus processes the second information for the group when the first information includes identification information capable of identifying a group.

6. The system of claim 2, wherein, in addition to the identification information, the first information includes information related at least one of services and goods provided to a user of the mobile terminal.

7. The system of claim 6, wherein the information related at least one of the services and goods is menu information arbitrary selectable by a user of the mobile terminal using the mobile terminal.

8. The system of claim 1, wherein the first communication module transmits the first information with a wireless signal in a millimeter wave range.

9. A wireless communication method comprises:
   communicating wirelessly between a first communication apparatus and a second communication apparatus,
   wherein the first communication apparatus generates first information associated with a mobile terminal; encodes the first information; and transmits the encoded first information to the mobile terminal by close range wireless communication, and
   the second communication apparatus receives the encoded first information transmitted by the mobile terminal and second information generated by the mobile terminal, by wireless communication; decodes the encoded and received first information; verifies validity of the decoded first information; and processes the received second information when the validity of the decoded first information is confirmed.

10. The method of claim 9, wherein the first information has no relation with personal information of a user of the mobile terminal and includes identification information capable of identifying the mobile terminal.

11. The method of claim 10, wherein the first information associated with a new mobile terminal is generated when the first communication apparatus comes into a state capable of close range wireless communication with the new mobile terminal.

12. The method of claim 9, wherein the first information includes identification information capable of identifying a group of a plurality of mobile terminals.

13. The method of claim 12, wherein the second information is processed for the group when the first information includes identification information capable of identifying a group.

14. The method of claim 10, wherein, in addition to the identification information, the first information includes information related at least one of services and goods provided to a user of the mobile terminal.

15. The method of claim 14, wherein the information related at least one of the services and goods is menu information arbitrary selectable by a user of the mobile terminal using the mobile terminal.

16. The method of claim 15, wherein the first communication apparatus transmits the first information with a wireless signal in a millimeter wave range.

* * * * *